April 9, 1957 J. R. JAMIESON 2,788,190
DIAPHRAGM VALVE CONTROLLER
Filed March 30, 1955 2 Sheets-Sheet 1

INVENTOR.
JOHN R. JAMIESON
BY Alan M. Staubly
ATTORNEY

United States Patent Office 2,788,190
Patented Apr. 9, 1957

2,788,190

DIAPHRAGM VALVE CONTROLLER

John R. Jamieson, Minneapolis, Minn., assignor to Minneapolis-Honeywell Regulator Company, Minneapolis, Minn., a corporation of Delaware Application March 30, 1955, Serial No. 497,967

8 Claims. (Cl. 251—11)

This invention relates to automatic recycling mechanisms generally and, more specifically, to an automatic recycling control mechanism for a diaphragm valve having a heat motor operated pilot valve.

Automatic recycling mechanisms for diaphragm valves are broadly well known in the heating controls and valve arts. However, the prior art recycling mechanisms take the forms of manually operated means which hold pilot valves in their valve "on" position while simultaneously holding a pair of contacts closed, which shunt a room thermostat controlling the motor for the pilot valve during power failure. The movement of the actuator for the pilot valve, causes the holding means for the pilot valve to be released, thus breaking the contacts shunting the room thermostat and returning the operation of the pilot valve to the control of the pilot valve motor and room thermostat, following power resumption.

It is an object of this invention to provide a diaphragm valve with an automatic recycling mechanism which will not return the control of the diaphragm valve to a room thermostat upon a temporary or momentary power resumption.

Another object of the invention is to provide an automatic recycling mechanism for a control device wherein the automatic recycling takes place only after a substantial time delay following power resumption.

A further object of the invention is to provide a heat motor operated valve having an automatic recycling mechanism associated therewith which acts independently of the movement of the heat motor means but responds to energization of the heat motor means.

Still a further object of the invention is to provide in a power operated control device, a manually operable latching means for holding the control device in its "on" position and which will, independently of the movement of the power means, release the control means for movement to its "off" position in response to energization of the motor means.

Still further objects of the invention will become apparent upon reading the following description of a preferred embodiment of the invention in conjunction with the accompanying drawing wherein.

Figure 1:
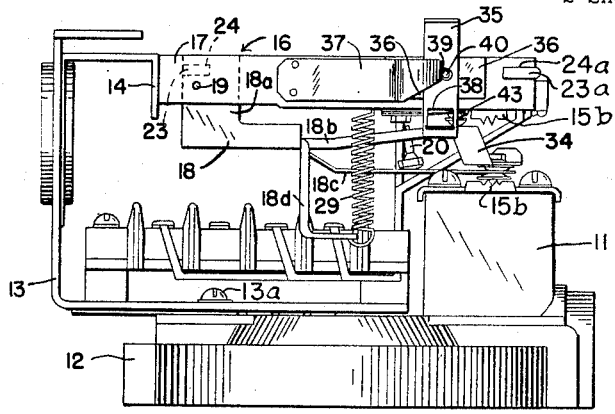
Figure 1 is an elevational view of the upper casting of a conventional diaphragm valve, showing the invention thereon and with portions removed and broken away.
Figure 2:
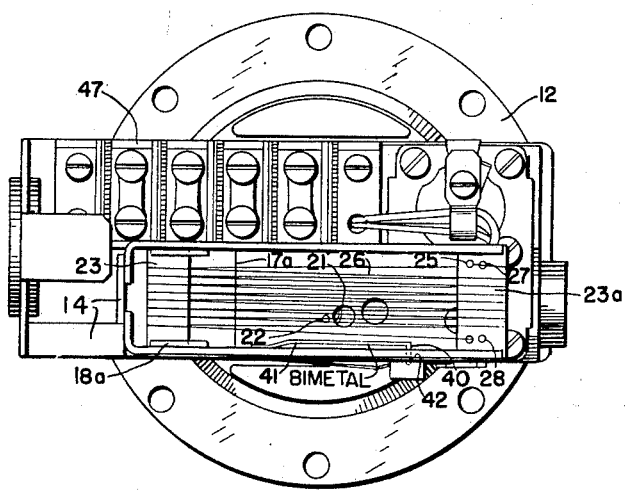
Figure 2 is a plan view of the invention illustrated in Figure 1.
Figure 4:
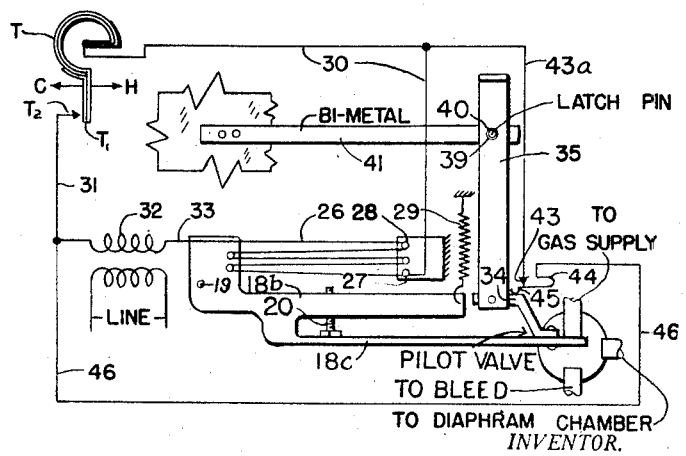
Figure 4 is a schematic showing of the invention including a wiring diagram for the power means.
Figure 3:
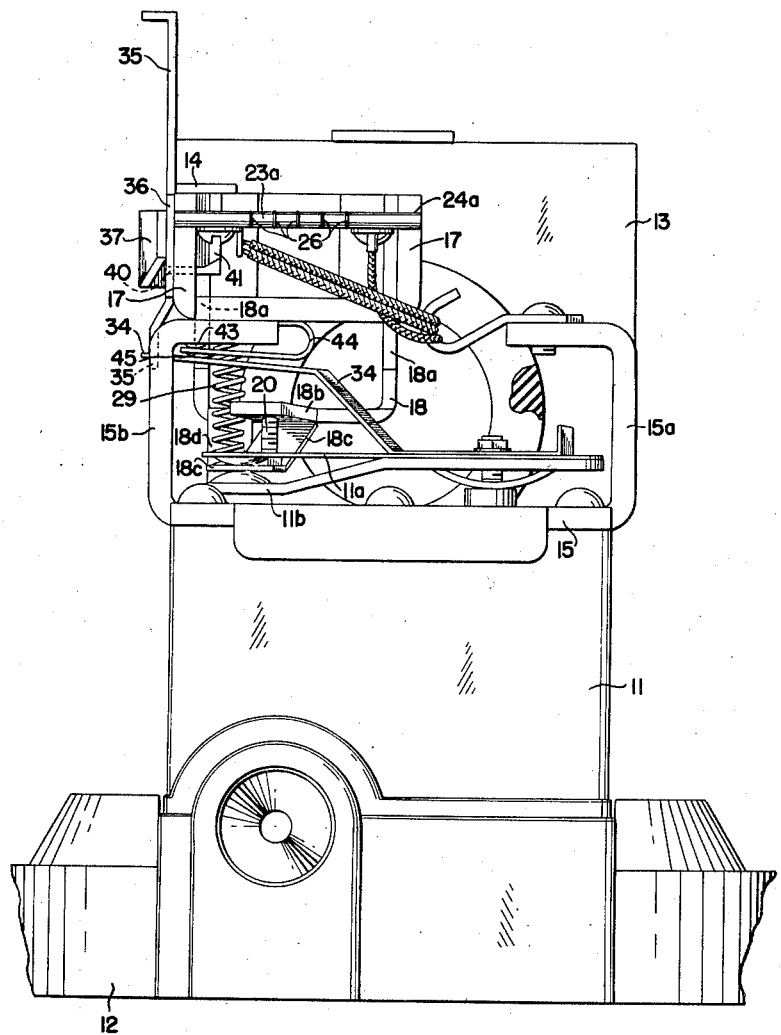
Figure 3 is an enlarged end view of the same casting.

The illustrated embodiment of the invention consists of a pilot valve or diaphragm controller 11, which is illustrated in Huntington Patent No. 2,667,897, that is secured to a top casting 12 of a conventional diaphragm valve, or to the top casting of a combined diaphragm valve and pressure regulator such as that illustrated in Sogge Patent No. 2,693,823. As the diaphragm controller forms no part of this invention other than in the general combination, it may suffice to say that it is of the type which moves to an "off" position wherein gas is permitted to flow from the inlet side of the diaphragm valve through the controller valve to the top of the diaphragm to close the diaphragm valve, and to an "on" position wherein gas is permitted to bleed from the chamber over the diaphragm through the controller valve to the atmosphere or to the combustion chamber of a furnace.

Also mounted on the diaphragm valve casting 12, is a bracket 13 which is secured to the casting by bolts 13a. The bracket 13 has an inverted L-shaped bracket 14 secured thereto and the cover 15 of the diaphragm controller 11 has a pair of inverted L-shaped arms 15a and 15b extending upwardly therefrom, one of which cooperates with the bracket 14 to support a heat motor 16 for actuating the diaphragm controller.

The heat motor consists of a channel-shaped frame portion 17 suitably secured to the bracket 14 at one end thereof and at the other end thereof to the arm 15b. The frame has an opening 17a at the left hand end thereof, as viewed in the drawing, into which extends the short leg 18a of a generally L-shaped lever 18. The lever 18 is pivoted to the frame 17 by means of a transversely extending pivot 19. The lever 18 has a generally horizontally extending long arm 18b with an adjusting screw screw-threaded therein for adjustably positioning a downwardly offset, relatively stiff but resilient arm extension 18c which is secured at its left end to the arm 18b by welding or other suitable means and extends at its right end between the actuator arms 11a and 11b of the diaphragm controller. It is thus seen that by adjusting the set screw 20, the angular position of resilient arm 18c with respect to the arm 18a may be varied for calibration purposes. An L-shaped downwardly extending arm 18d, which is integral with the arm 18b, has a coiled compression spring 29 anchored in one end thereof with the other end of the spring anchored in laterally spaced holes 21 and 22 in the base of the frame 17, to normally tend to rotate the lever 18 counterclockwise about the pivot 19 to move the diaphragm controller to its "on" position, which permits the diaphragm valve to open. The means for actuating lever 18 in a clockwise direction, to move the diaphragm controller to its "off" position, thereby causing the diaphragm valve to close, consists of blocks 23 and 23a of electrically insulating material having less wide extensions on each end thereof that fit in notches 24 and 24a in the arms 18a and in the other end of the frame 17, respectively, and a suitable electrically conducting and heat expandable wire 26 wound around the spaced blocks with the ends thereof extending through holes 25 in the block 23a and soldered or otherwise connected to terminal posts 28 and 27 secured to the block 23a. The wire is wound sufficiently tightly around the blocks 23 and 23a so that when there is no electricity passing through the wire, it will shrink and cause the block 23 to be pulled toward the block 23a and thus pivot the arms 18a and the entire lever 18 clockwise about the pivot 19 to move the diaphragm controller to its "off" position. When electric current is passing through the wire, the wire will expand permitting the spring 29 to move the arm 18c and lever 18 counterclockwise to move the diaphragm controller to its "on" position, thus opening the diaphragm valve.

The energization of the wire 26 is controlled by a room thermostat T which is connected to one end of the wire coil by lead line 30 and to the other end of the coil of wire 26 through the movable contact T1 and fixed contact T2 of the thermostat, lead 31, secondary 32 of a conventional transformer and lead 33 connected to the connector or terminal post 28.

To provide for operation of the diaphragm valve to its open position when there has been a power failure, an extra arm 34 is secured to the diaphragm controller and laterally offset with respect to the two actuating arms 11a and 11b. This is a manual actuating means which extends across and below the lever 18 for engagement with a vertically slidable and manually operable plunger 35. The plunger is resiliently held against the side of the frame 17 by a leaf spring 37 and vertically guided by blocks 36 welded to the frame 17. An opening 38 in the lower end of the plunger 35 receives the outer free end of the lever 34 while a hole 39 intermediate the ends of the plunger 35 is adapted to receive a pin 40 on a bimetallic latch member 41 when the plunger 35 has been lifted to open the valve.

In order to release the diaphragm controller to move to its off position and to return the valve to the automatic control by the room thermostat, a strip of bimetal 41 is spot welded or otherwise secured to the side of the frame 17 in a position to be heated by the electricity passing through the coil of wire 26. The bimetal and pin length are so selected that more time is needed to sufficiently heat the bimetal so as to cause the pin 40 carried at the free end thereof to be withdrawn through the hole 42 in the frame 17 and out of engagement with the hole 39 in the plunger 35, than is required to sufficiently heat the coil of wire 26 so as to actuate the diaphragm controller to the valve "on" position. With this arrangement, a temporary power resumption, which might be sufficient to cause the conventional automatic recycling mechanism to return the valve to its automatic control, will not cause the mechanism of this invention to so return the valve controlled thereby to its automatic control. Only if a sustained power resumption, indicating a normal power resumption, will cause the bimetal to be heated sufficiently to return the diaphragm controller to the control of the room thermostat and the heat motor.

In order to provide for energization of the wire 26 upon power resumption, even though the room thermostat may not be calling for heat, a fixed contact 43 and a resilient contact arm 44 are electrically insulated from each other and insulatively connected to the base of the frame 17. In this position the arm 34 will engage a button 45 on the free end of the contact arm 44 for moving the free end of the arm 44 into engagement with the contact button 43 upon the plunger 35 being raised to its latching position with respect to the pin 40. The fixed contact 43 is connected through lead line 45 to the lead line 30 and thus to the room thermostat T and the binding post 27 while the flexible contact arm 44 is connected through lead line 46 through a binding post on the terminal block to the secondary of the transformer. It is thus seen that the contacts 43 and 44 and the lead lines 43a and 46 are in shunt relationship with respect to the room thermostat so that regardless of whether the thermostat is calling for heat or not, power resumption will cause heating of the wire coil 26. When the pin 40 is moved out of engagement with the plunger 35, there is enough resilience in the flexing contact arm 44 and in the arm 34 to cause the plunger 35 to move to its lowered position and to move out of engagement with the contact 43. As the free end of the arm 34 of the diaphragm controller is flexed a little past its normal "on" position when controlled by the heat motor, when it is manually moved by the plunger 35 to the on position thereof, it will move away from the button 45 on the flexible arm 44 a sufficient distance so that it will not cause contacts 44 and 43 to make when the diaphragm controller is moved to its "on" position by the heat motor.

*Operation*

The invention is illustrated with the elements of the apparatus in the positions they retain after the plunger 35 has been manually moved to a "latched on" position following a power shut down. In other words, the pin 40 of the bimetal strip is extending into the hole 39 in the plunger 35 to hold the diaphragm controller in its "on" position regardless of whether the thermostat is calling for heat or not. Should power to the transformer be resumed, current will flow from the right hand end of the secondary 32 through line 33, connection 28, wire 26, connection 27, line 30, line 45, fixed contact 43, movable contact 44 to line 46 back to the left hand end of the secondary 32. Should the current remain on sufficiently long to not only energize the wire 26 sufficiently to expand or lengthen and thus permit the spring 29 to move the diaphragm controller to its "on" position but also sufficiently to heat the bimetal enough to remove the pin 40 from the plunger 35, plunger 35 will be released to permit the diaphragm controller to move to the normal "on" position under the control of the heat motor 16, even though the room thermostat may not be calling for heat. Thereafter, as long as there is no additional power failures the movement of the diaphragm controller between its "on" and "off" positions will result from the energization and deenergization of the heat motor in response to signals from the room thermostat.

While I have described the preferred embodiment of the invention as being applied to a diaphragm valve for supplying gas to a furnace and have illustrated preferred structural details of the invention, it is deemed to be apparent that the invention has utility in operating controls in other fields with equally advantageous results and that other modifications may be made of the invention without departing from the spirit thereof. Therefore, it is to be understood that the scope of the invention is to be determined solely by the appended claims.

I claim:

1. In a diaphragm operated gas valve controlled by a heat motor operated valve, the combination comprising a valve, a heat motor for actuating the valve, bimetallic heat responsive means having an abutment thereon and positioned to be heated by the heat escaping from said heat motor, manually operable means resiliently connected to said valve for actuating it to its "on" position, and means on said manually operable means for engaging said abutment when said heat responsive means is cool and said manually operable means is in its position to hold said valve in its "on" position, said heat responsive means being movable in response to the heat generated by said heat motor to cause said abutment to move out of engagement with said means on said manually operable means to permit said valve to move to its normal "on" position as determined by said heat motor.

2. In a power operated control, the combination comprising power means for actuating a control, energy responsive means having holding means thereon and positioned to sense when energy is supplied to said power means, manually operable means resiliently connected to said control for actuating it to its "on" position, and means on said manually operable means for engaging said holding means when said energy responsive means is unenergized and said manually operable means is in its position to hold said control in its "on" position, said energy responsive means being movable in response to energization of said power means to cause said holding means to move out of engagement with said means on said manually operable means to permit said control to move to its "off" position.

3. The combination comprising a control, a heat motor for actuating the control, heat responsive means having an abutment thereon and positioned to be heated by said heat motor, manually operable means resiliently connected to said control for actuating it to its "on" position, and means on said manually operable means for engaging said abutment when said heat responsive means is cool and said manually operable means is in its position to hold said control in its "on" position, said heat responsive means being movable in response to the heat generated by said heat motor to cause said abutment to move out of engagement with said means on said manually operable means to permit said control to move to the "on" position it is normally actuated to by said heat motor.

4. In a heat motor operated valve, the combination comprising a valve, a heat motor for actuating the valve, heat responsive means having an abutment thereon and positioned to be heated by the heat lost from said heat motor, manually operable means resiliently connected to said valve for actuating it to its "on" position, and means on said manually operable means for engaging said abutment when said heat responsive means is cool and said manually operable means is in its position to hold said valve in its "on" position, said heat responsive means being movable in response to the heat generated by said heat motor to cause said abutment to move out of engagement with said means on said manually operable means to permit said valve to move to a position determined by the position of said heat motor.

5. A power operated control comprising a control member movable between "on" and "off" positions, motor means for operating said control member, second means for moving said control member to its "on" position, means responsive to the energization of said motor means and movable independently of the movement of said motor means for holding said second means in its "on" position and for freeing said second means to permit said control member to move to its "off" position.

6. A power operated control comprising a control member movable between "on" and "off" positions, heat motor means for operating said control member, second means for moving said control member to its "on" position, means responsive to the energization of said motor means and movable independently of the movement of said heat motor means for holding said second means in its "on" position and for freeing said second means to permit said control member to move to its "off" position.

7. The combination comprising a control member movable between "on" and "off" positions, motor means for operating said control member, manually operable second means for moving said control member to its "on" position, means for holding said second means in its "on" position and responsive to the energization of said motor means and movable independently of the movement of said motor means for freeing said second means to permit said control member to move to its "off" position.

8. A power operated control comprising a control member movable between "on" and "off" positions, motor means for operating said control member, second means for moving said control member to its "on" position, latch means for engaging and holding said second means in its "on" position and responsive to the energization of said motor means and movable independently of the movement of said motor means for freeing said second means to permit said control member to move to its "off" position.

References Cited in the file of this patent
UNITED STATES PATENTS

| | | |
|---|---|---|
| 1,901,070 | Williams | Mar. 14, 1933 |
| 1,936,502 | Donohue | Nov. 21, 1933 |